(12) United States Patent
Heatherington et al.

(10) Patent No.: US 7,617,916 B2
(45) Date of Patent: Nov. 17, 2009

(54) TAPERED CRUSHABLE POLYGONAL STRUCTURE

(75) Inventors: David W. Heatherington, Spring Lake, MI (US); Alfred G. S. Cini, Grand Rapids, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 12/252,077

(22) Filed: Oct. 15, 2008

(65) Prior Publication Data
US 2009/0102234 A1 Apr. 23, 2009

Related U.S. Application Data

(60) Provisional application No. 60/980,546, filed on Oct. 17, 2007.

(51) Int. Cl.
*B60R 19/34* (2006.01)
(52) U.S. Cl. .................. 188/371; 188/377; 293/133
(58) Field of Classification Search ........... 188/371, 188/377; 293/102, 133
See application file for complete search history.

(56) References Cited

U.S. PATENT DOCUMENTS

| 5,306,058 | A | * | 4/1994 | Sturrus et al. ............ 293/154 |
| 5,468,033 | A | | 11/1995 | Dohrmann et al. |
| 6,174,009 | B1 | | 1/2001 | McKeon |
| 6,349,521 | B1 | | 2/2002 | McKeon et al. |
| 6,474,709 | B2 | | 11/2002 | Artner |
| 6,588,830 | B1 | | 7/2003 | Schmidt et al. |
| 6,648,384 | B2 | | 11/2003 | Nees et al. |
| 6,702,346 | B2 | | 3/2004 | Wikstrom |
| 7,252,314 | B2 | | 8/2007 | Tamura et al. |
| 2005/0213478 | A1 | * | 9/2005 | Glasgow et al. ............ 369/262 |
| 2005/0285414 | A1 | * | 12/2005 | Liu et al. .................... 293/102 |
| 2006/0237976 | A1 | * | 10/2006 | Glasgow et al. ............ 293/132 |
| 2008/0093867 | A1 | * | 4/2008 | Glasgow et al. ............ 293/102 |
| 2008/0106107 | A1 | * | 5/2008 | Tan et al. ................... 293/133 |

FOREIGN PATENT DOCUMENTS

WO WO 2006/113608 A2 10/2006

* cited by examiner

*Primary Examiner*—Christopher P Schwartz
(74) *Attorney, Agent, or Firm*—Price, Heneveld, Cooper, DeWitt & Litton LLP

(57) ABSTRACT

An energy management structure includes an elongated polygonal tube with at least four walls, the tube having a larger first end and a smaller second end, at least two of the walls including a longitudinally-extending channel-shaped tapered rib starting at the smaller second end and extending toward the larger first end. The ribs become shallower near the larger first end. The walls include crush initiators so that the ribs do not provide undesired strength to the tube during a longitudinal impact. A related method includes roll-forming a polygonal tubular shape with at least four walls, at least two of the walls including longitudinally-extending channel-shaped ribs, and reforming the tubular shape into a tapered polygonal shape with a larger end and a smaller end, the ribs becoming shallower as the ribs extend closer to the larger end.

24 Claims, 6 Drawing Sheets

PRIOR ART

TAPERED CRUSHABLE POLYGONAL STRUCTURE

This application claims benefit of provisional application No. 60/980,546, filed Oct. 17, 2007, entitled TAPERED CRUSHABLE POLYGONAL STRUCTURE.

BACKGROUND

The present invention relates to crushable structures configured for energy absorption and energy management such as during a vehicle crash.

Vehicle components are designed to reduce property damage and provide safety to the occupants of an impacted vehicle through energy management.

Energy management is typically accomplished by designing vehicle components for predictable and repeatable deformation. In low-speed impacts, components such as bumpers and bumper brackets are designed to absorb significant amounts of energy when impacted via deformation of these components. For higher-speed impacts, the vehicle chassis is designed to absorb energy by deforming. Side impacts also use deformable components such as sills, rocker panels, pillars and door impact beams. One main difference between the side impact components and those components located on the front or the rear of the vehicle is in how they are designed to absorb energy via deformation. The side impact components absorb energy via deformation associated with side-bending-type shape change of the components. Frontal and rear components such as bumper brackets and chassis components are designed to crush in an accordion fashion in a direction parallel to the impacting force. In frontal and rear impacts, the collision is either between a moving vehicle and a fixed object (wall, barrier, pole, tree, etc.) or between two moving vehicles. The impact energies are typically high due to speeds and crash dynamics. Chassis components must be able to deform in a predictable and repeatable manner to provide safety to the occupants and reduce property damage.

Different types of component failure will produce different response curves and varying degrees of efficiency in terms of how the energy is absorbed. Impact energy absorption is calculated by multiplying a force of impact resistance times the impact stroke of a component. A component having a high efficiency of energy absorption is generally described as a component that upon impact jumps quickly to a desired resistance force and then maintains ("holds") that force and thus absorbs a desired maximum amount of energy continuously over a desired maximum stroke distance. A tubular structure that bends over when impacted in a near axial direction has absorbed energy, but has not done so in a very efficient manner. A more efficient response would be had if the tube folded on itself in an accordion fashion. The accordion-type deformation provides the greatest amount of energy absorption within the provided package space. The final deformed piece represents the smallest packaging space of stacked material. The described innovation defined in this write-up is a crushable tubular structure that when impacted in a near axial direction, will collapse on itself in an accordion fashion. This innovative design can be scaled for small applications such as a bumper bracket or for larger applications such as a chassis component.

The use of tubular structures for both chassis components and/or bumper brackets is nothing new. These types of tubular structures have been used on many various components throughout the vehicle. Most applications with these types of tubular structures coincide with protection from axial and near axial impacts. There are various manufacturing processes that are capable of producing tubular structures that when impacted in a near axial direction, will collapse on itself in an accordion fashion. The complexity and inherent cost associated with the manufacturing processes tend to increase as the energy management efficiency of the design increases. Manufacturing processes capable of producing tubular structural components and ranked by cost from high to low include hydro-formed, clamshell designs fabricated from two stampings spot-welded together, deep-drawn stamping, simple expansion using internal mandrels, and simple roll-formed tubular designs with crush initiators. Tubular components can be formed by hydro-forming processes into complex shapes having non-uniform cross sections that vary along their length, where the non-uniform cross sections are tailored for particular needs and properties, such as for energy absorption. For example, vehicle frames often include hydro-formed components. However, hydro-forming processes are expensive, messy (since they involve placing a fluid within a tube and then pressurizing the fluid), and tend to require relatively long cycle times. Further, they become generally not satisfactory when higher strength materials are used, such as High-Strength-Low Alloy (HSLA) materials, and/or Advanced-Ultra-High-Strength Steel (AUHSS) materials, since these materials are difficult to form, have low elongation and poor formability, and tend to wear out tooling quickly. Further, higher strength materials often tend to kink upon impact, which leads to localized bending at minimal points (and not widespread and multi-point bending and "crushing"), which in turn results in premature catastrophic failure and lower energy absorption as well as less predictability of energy absorption during impact.

Some current processes for forming crushable tubes use hydro-forming processes. However, hydro-forming processes are expensive and capital intense, since liquid must be captured within the part and then pressurized. Capturing liquid within a part sufficiently for high pressure is difficult, time consuming, required expensive tooling, and is generally messy. Further, hydro-forming is limited to approximately 15% expansion of material over the length of the part. Further, hydro-forming is limited in the types of materials that can be used. The hydro-forming process has been used in the past to produce chassis frame rail tips. However, the process is slow and typically restricted with the use of higher grade materials due to the inability to move material with the internal fluid pressure.

Another potential process for forming crushable tubes is stamping, where two clamshells are stamped and then welded together. However, the overlapped weld seam associated with a clamshell type design is not desirable due to the amount of weld, heat and weight added to the part. Further, fixturing of the parts, welding, and secondary processing is expensive and requires significant "extra" handling of parts. Further, the overlapped flanges that are welded together result in wasted material, and further can lead to undesirably strong regions on the parts. Apertures can be added to stamped crush tubes to promote the accordion crush of the part. However, this may require the process to utilize a progressive die and a considerable increase in tonnage to accommodate the large number of piercings. Stamping is also limited in the grades of material that can be stamped due to the rapid forming associated with the process. Higher grade materials with high physical properties and low formability are incapable of being stamped due to the large amount of forming associated with the stamping process and due to tool wear and abuse from the (high strength) materials.

It is desirable to provide a crushable structure that can be made from high-strength steels, yet with reasonable cost and that will crush during an impact with excellent repeatable and predictable results. Thus, a component, and apparatus and method of manufacturing same having the aforementioned advantages and solving the aforementioned problems is desired.

SUMMARY OF THE PRESENT INVENTION

One aspect of the present invention, a method of forming an axial crushable structure suitable for energy absorption during axial or near-axial impacts includes roll-forming a polygonal shape, where on at least one surface of the polygonal shape is a non-planar geometric form that runs the length of the part. The geometric form contains material in excess of the material displaced with the geometric form. The excess material is used to reshape the tube by elongating the side of the polygonal shape that contains the geometric form and in essence removal of the geometric form. The removal of the geometric form from the roll-formed polygonal shape is accomplished off-line to the roll-forming process and might be achieved via mechanical expansion. One end of the crushable structure maintains the roll-formed geometry and the other end of the crushable structure maintains overall shape but with an increase in geometric.

In another aspect of the present invention, an energy management structure includes an elongated polygonal tube with at least four walls and corners joining the four walls, the tube having a larger first end and a smaller second end, at least two of the walls including one or more longitudinally-extending channel-shaped tapered rib starting at the smaller second end and extending toward the larger first end. The ribs extend at least half of a length of the tube and become shallower the closer that the ribs are to the larger first end. The walls include crush initiators so that the ribs do not provide undesired strength to the tube during a longitudinal impact.

In another aspect of the present invention, a method comprises steps of roll-forming a polygonal tubular shape including at least four walls and corners joining the walls, at least two of the walls including one or more longitudinally-extending channel-shaped ribs, and then reforming the tubular shape into a tapered polygonal shape with a larger end and a smaller end, the ribs becoming shallower as the ribs extend closer to the larger end.

In another aspect of the invention, the transition from one end of the crushable structure to the other end is gradual and can be accomplished via a symmetrical taper along two surfaces of the part. The resulting part contains a taper angle along two surfaces and is referred to as a double tapered geometry. A single tapered part where taper angle is present along one surface of the part is possible and is referred to as a single tapered geometry. The decision to use single taper or double taper can be based on issues including design packaging, attachment of additional parts, deformation characteristics, etc.

Another aspect of the invention is associated with the inherent benefits with the forming processes used to create the crushable structure. The benefits of roll-forming include processing speed, lack of offal scrap, inline welding for tubular designs, pre-piercing of apertures, and the flexibility to form various grades of the steel that range from mild steels all the way to Advanced Ultra High Strength Steels (AUHSS). The use of higher grade steels can help to reduce part weight and maintain performance. The use of pre-pierced apertures such as crush initiators also removes the need for costly secondary processes. By taking advantage of the benefits associated with roll-forming of the crushable structure, the end result is an optimized design that is weight and price competitive and provides equivalent or better performance when compared with crushable structures fabricated from other manufacturing processes such as hydro-forming and welding together two stamped clamshells.

An object of the present concept is to provide crushable structures that are polygonal tubular in shape, and that will predictably collapse under static or dynamic loading when the loading is applied in an axial or near axial direction. Collapse is achieved in an accordion-style crush where deformation initiates at the smaller end of the structure and propagates to the larger end of the structure.

Another object is a product made from metal reworked from an initial shape to achieve the product's final shape. The material choice is steel, including potentially ultra high strength steel, but it is envisioned that the part could be made from aluminum or other materials with formable qualities.

An object is that the present invention takes maximum advantage of roll-forming, but it is envisioned that the present inventive concept can include extruded products. A preferred choice of material is a grade of steel restricted only by the requirements that exist for the post deformed shape. The roll-forming process of steel is not limited to material grade, but it is noted that the bend radii of the channel-shaped structural ribs and the polygonal shape should preferably adhere to (conform to) established practices in roll-forming. Notably, roll-forming can form material with very low formability (elongation), such that the roll forming process can be used even with very high strength steels (such as those with 120 ksi or 220 ksi tensile strengths or higher). The accordion-style crush that results when the part is impacted in an axial or near-axial impact will cause the material to experience bends approaching a thickness of the material. These tight bends that result from the accordion-style crush may initiate material cracking if the bend radius of the material has been exceeded. Cracking in material during an impact adversely affects impact strength since it reduces energy absorption. Further, cracking of material is usually not acceptable due to the possibility of unpredictable behavior. However, as noted above, the use of roll-forming will allow for the use of the most Advanced Ultra High Strength Steels (AUHSS), which have a very low stretchability and hence an increased tendency to cracking during an impact. Further, the overall shape of the present tubular structure permits use of materials with low stretchability, but with very high tensile strengths and very thin materials.

An object of the present invention is that it permits the use of Structural, High Strength Low Alloy (HSLA), and also Ultra High Strength Steels (UHSS and AUHSS), which provide advantages in weight savings over mild grade steels since thinner sheets can be used. A reduction in thickness is achieved without degradation in performance due to the higher physical properties of these materials.

An object of the present invention is to allow use of a two step process, where the product is first roll-formed into a tubular shape with continuous cross sectional shape, and then reformed to include a larger end, yet without significant stretching of the material at the larger end. The roll-form process is desirable over other processes due in part to the fact that roll-forming can produce closed tubular polygonal shapes with apertures. The apertures are added to the parts in the roll-formed process and when the material is in the flat and before it is fed into the roll tooling (i.e., pre-pierced apertures). In roll-forming, either contact welding or high frequency induction welding can be used to permanently close the shape and produce a tubular polygonal shape.

An object of the present invention is to provide a roll-formed part that is reformed to produce a single or double tapered crushable structure. Reforming can be done using internal mandrels and hydraulics . . . and potentially an exterior compression box for the internal mandrels to press the tube against if needed. The secondary process is cost efficient and requires minimal capital investment in tooling.

An object of the present invention is to provide processes that can produce single or double tapered crush able structures.

An object of the present invention is to provide an increased ability to select a suitable material. For example, if an aluminum crushable structure was desired, the initial shape would potentially be extruded and then reformed in a secondary operation. An additional secondary operation would be necessary to apply any apertures.

An object of the present invention is to provide an increased ability to select an optimal and lower cost process.

These and other aspects, objects, and features of the present invention will be understood and appreciated by those skilled in the art upon studying the following specifications, claims, and appended drawings.

DESCRIPTION OF ONE PRIOR ART

Figure 1:
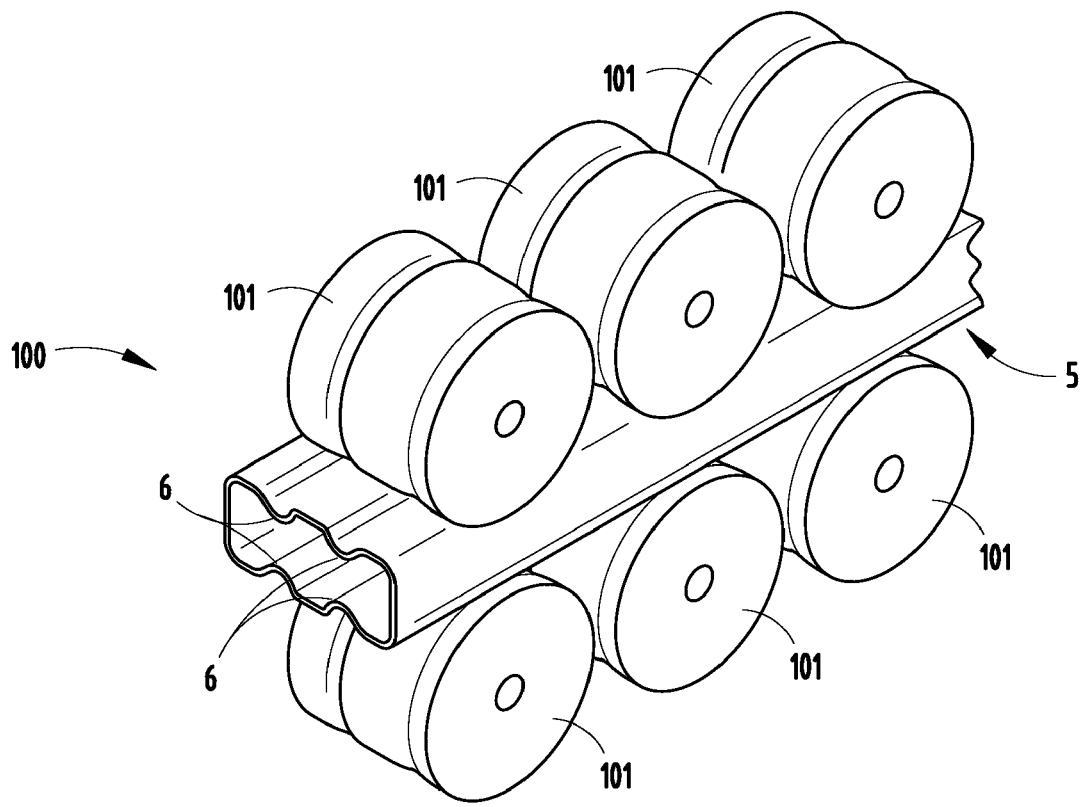
FIG. 1 is roll forming mill/apparatus forming a tubular shape as per FIG. 2.
Figure 11:
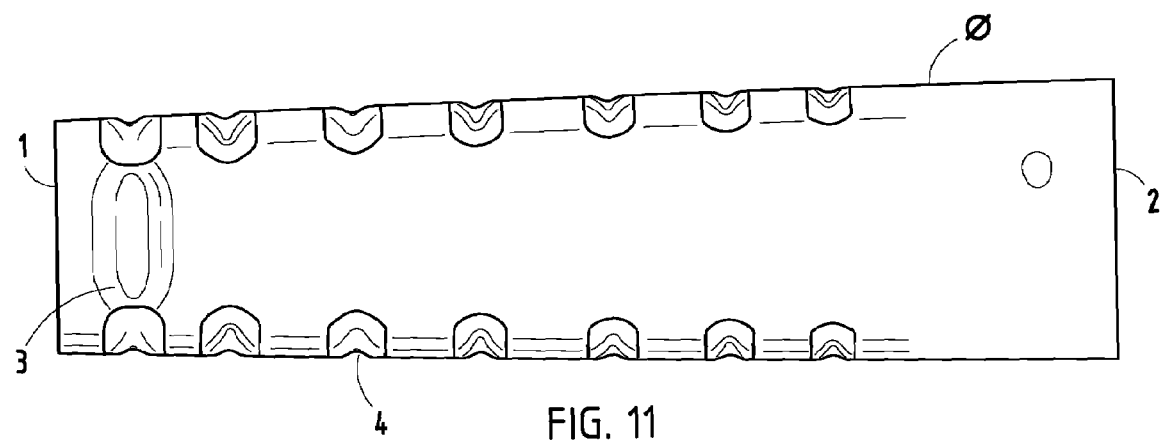
FIG. 11 is a side view of a crushable frame rail tip in prior art.
Figure 12:
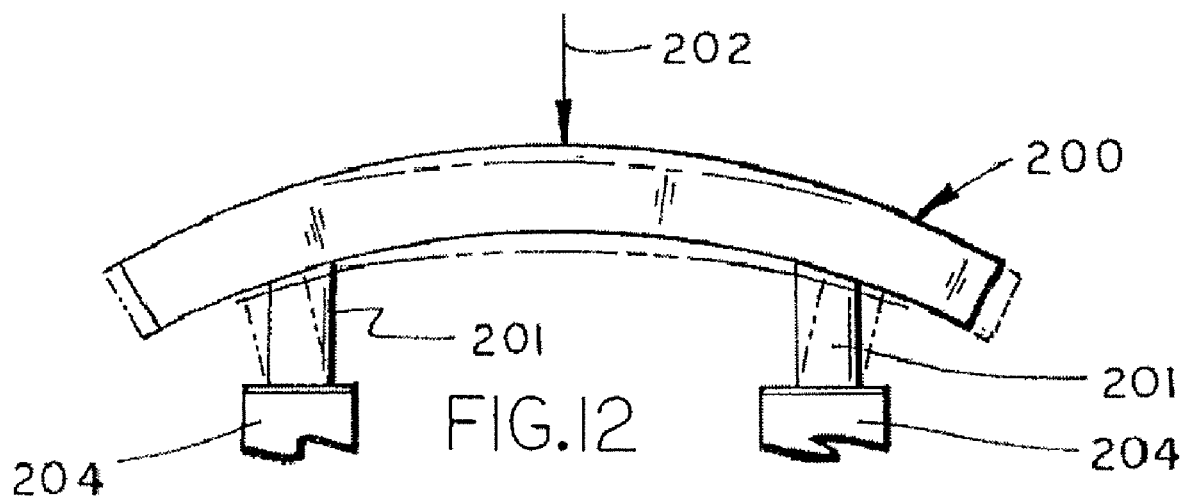
FIG. 12 is a top view showing an arrangement in prior art using a pair of frame rail tips for mounting a transverse bumper reinforcement beam to a vehicle frame.

FIG. 11 discloses a chassis frame rail tip 0 in prior art produced using hydro-forming. The hydro-forming process takes a round tube and then uses a specially shaped die that mimics the part's final design. The die both forms the part and also acts as a positive external stop when a fluid is used internally at high pressure to move material into areas of the die. The smaller end 1 of the frame rail tip is the forward end of the tip and usually includes some type of brackets that affix a cross member or bumper beam to the ends of the frame rail. The larger end of the frame rail tip 2 is typically inserted inside of or attached to the longitudinal frame of the vehicle. The tip end 2 and the frame rail are welded together typically using MIG, and the frame and the tip are welded completely around the circumference of the frame end. Crush initiators 3 and 4 are added into the tube during the hydro-forming process to facilitate the desired crush mode when the frame rail tip 0 is impacted in an axial or near-axial impact. FIG. 12 (copied from FIG. 1 in patent McKeon U.S. Pat. No. 6,174,009) illustrates a typical prior art arrangement where a pair of frame rail tips 201 are used to mount a transverse bumper reinforcement beam 220 to a vehicle frame 204 for absorbing energy of a longitudinal force 202 during a front end vehicle crash.

DETAILED DESCRIPTION OF PREFERRED EMBODIMENTS

This write up will concentrate on chassis frame rail tip applications, though it is contemplated that the present inventive concepts can be applied to any single or double tapered crushable structure application. Further, it is contemplated that the concept is scalable and can be used on any size tapered crushable structure.

The present concept combines common manufacturing processes to produce a unique tubular structure which upon near axial impacts, produces a lower-weight part having a force-deflection response similar to that produced by the more expensive hydro-forming process. Coiled sheet metal is pre-pierced, roll-formed, welded, and cut-off before it is reshaped using internal mandrels. The final product is a tapered design where height differences are accounted for by the use of extra material that is formed along the perimeter of the part and down the length of the part. The extra material can be used equally to change the vertical length above and below the centerline of the part to produce a double tapered part or changing of the vertical length only in one direction above or below the centerline of the part will produce a single tapered part. Common uses of the formed geometry would include chassis frame rail tips and bumper crush boxes. It is envisioned that this concept can be used in any application where a crushable structure that will absorb energy via an accordion-style deformation when impacted in an axial or near-axial direction.

Roll-forming (FIG. 1) is used to form the initial tubular geometric shape. Other manufacturing processes can be used to create the initial shape, but these other processes prove to be less desirable due to economies including capital cost, tooling cost, cycle time, and manufacturing restrictions.

The roll-forming process economically produces a finished first stage part that only requires one additional stage of mechanical reforming to produce the desired finished part. It should be mentioned that the ability to pre-pierce while the material is in the flat and before material enters the roll-forming process provides an extreme amount of flexibility to impart apertures to the material and to do this very economically. The apertures can be used to accommodate other attachments to the part or the apertures can be used to assist in the accordion style deformation that is desired on axial or near-axial impacts. Since the material is in the flat, holes and/or slots can be pierced in locations that correspond with the part radii. These holes and/or slots act as triggers or commonly called crush initiators and will help to predictably deform the structure in an accordion fashion when impacted. Cost to pre-pierce in the flats is minimal and does not affect the cycle time of the roll-forming process since flying pre-pierce dies are used. For example, a flying pre-pierce die can be made to travel with the sheet material as the material moves into the roll-former.

Roll-forming uses a series of passes where each pass is used to gradually form the material from flat to final shape. Since roll-forming forms the material gradually from pass to pass, the process is practically insensitive to material properties and hence has the ability to successfully form the highest grade materials into the most complex shapes. The higher grade materials suitable for roll-forming are not always suitable for crushable structures. A high strength material will have a corresponding lower amount of elongation which would be less than desirable for a crushable structure. Since a crushable structure will exhibit tight bend radii due to the resulting accordion-style deformation, a higher grade material with a low amount of elongation would more than likely exhibit cracking in these tight bend radii areas. Cracking in the bend radii is more than likely not acceptable for a high speed impact component but may be acceptable of for a low speed impact component. A high speed impact component might include frame rails tips whereas a low speed impact component might include a bumper bracket. Notably, stamping and hydro formed parts have more stringent requirements when it comes to acceptable materials for the manufacturing processes. Both of these processes have difficulty forming higher grade materials that have a low elongation value. Contrastingly, roll forming can handle the higher grade materials, yet produce consistent parts quickly and in high volume with minimal tool wear.

Figure 2:
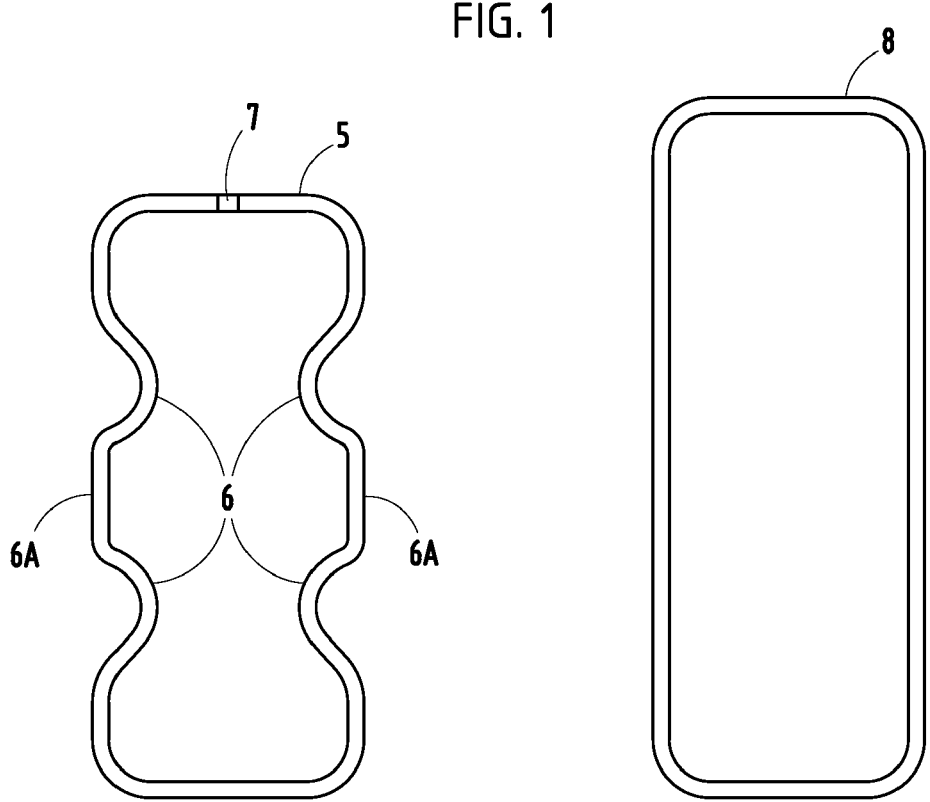
FIG. 2 is a cross-sectional view of a roll-formed shape that includes geometric ribs as formed in FIG. 1.
Figure 3:
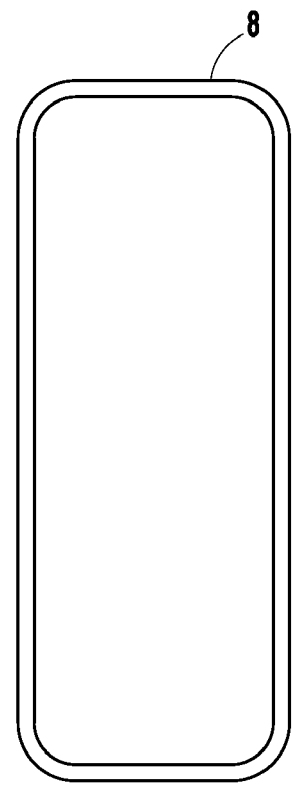
FIG. 3 is a cross-sectional view of the reformed roll formed section at the (larger) tall end of the frame rail tip

The proposed concept relies on roll-forming using a roll former apparatus 100 with rolls 101 as the preferred mode of fabrication of the tube 5. FIG. 2 shows a cross section of the roll-formed shape 5. The shape is made from coiled steel and can successfully be formed using any grade of metal. The steel applications can be fabricated from material that range in material properties from mild grade steel with tensile strengths less then 35 ksi to Advanced Ultra High Strength Steels (AUHSS) with tensile strength above 220 ksi. The coiled metal is folded up slowly by passing the material through successive roll-form passes. The tubular structure is welded 7 together using standard welding processes that are common to roll-forming applications; i.e., high frequency induction welding and contact welding. Special ribs 6 are rolled into the geometry and along the length of the part to form a tube 5 with constant cross section. The wall portion 6A between the pair of ribs 6 on teach side is preferably relatively flat and may have somewhat sharp radii at each end of the wall portion 6A. This serves as a site for gripping when expanding the tube 5, so that a same amount of expansion occurs in opposite directions from the wall portion 6A. The ribs 6 are stretched out of the part at one end using a secondary reforming operation. The size of the ribs and the number of ribs are defined by the final size of the one end of the part. FIG. 3 contains the cross section 8 of the double tapered frame rail tip at the end of the part where the size is the largest. The perimeter of 8 is the same as the perimeter of section 5 in FIG. 2. The difference is that the perimeter of 8 in FIG. 3 does not contain the rib structures 6 and instead the material is used to increase the height of the part. The perimeters (i.e. length of the perimeters) of both ends 5 of FIGS. 2 and 8 of FIG. 3 are basically identical, with the only difference being that the rib structures are only present on the smaller end 10 of the tip. These rib structures wash out in depth and shape as different cross sections are viewed from the small end of the tube to the large end of the tube.

Figure 4A:
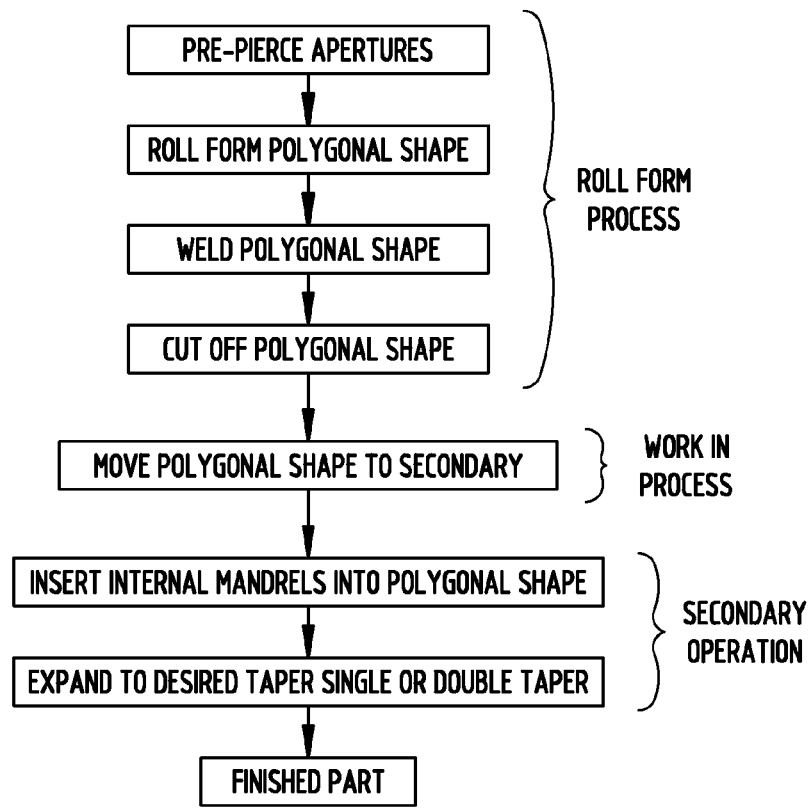
FIG. 4 shows a block diagram of the manufacturing process.

FIG. 4 contains a block diagram of the manufacturing processes used to fabricate a tapered polygonal crushable structure. The manufacturing process is made up of two separate processes; a roll-forming operation and a secondary resizing operation. The roll-form operation takes coiled metal and passes the material through a stamping die that is configured to stamp apertures into the material and to do this operation while the material is moving. A flying die setup is used to permit press stamping while the material is moving through the press bed. Cycle time is reduced significantly due to the use of a flying die and in turn this efficient operation helps to reduce overall piece price. After stamping of apertures, the material is moved through the roll-form tooling where the final shape is achieved by the summation of forms associated with each individual pass. The polygonal shape is welded using conventional welding, i.e., high frequency induction welding or contact welding during the roll forming process. The final process associated with the roll-forming process is cutoff and this can be accomplished for example with a guillotine-type cutter or a circular cutting blade.

Figure 4B:
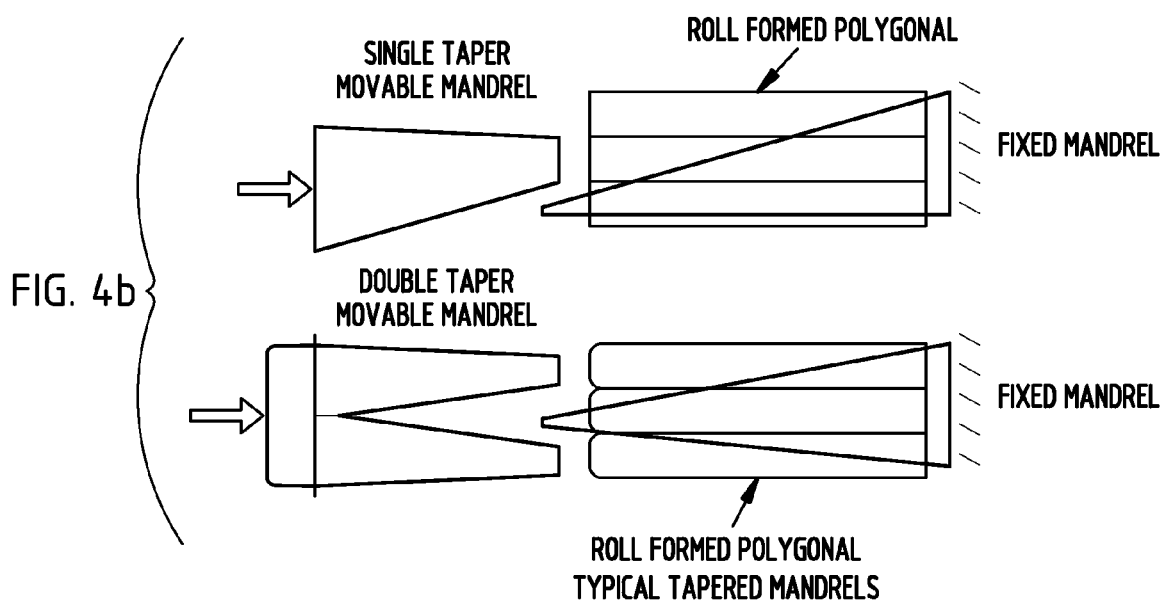

The parts are then moved to a secondary manufacturing cell where a combination of internal mandrels is used to reform one end of the tube. The style and design of the internal mandrels will decide if the final reform is single tapered or double tapered. FIG. 4b discloses a typical single tapered mandrel (see top of FIG. 4b) and a double tapered mandrel (bottom of FIG. 4b) that can be used to reform the end of the roll-formed polygonal sections. Hydraulics can be used to apply motion to the movable mandrel(s). It is envisioned that the mandrels can be made of a combination of materials. Tool steels which might prolong tool life could be used for the movable mandrel(s). Bronze could be used for the fixed mandrel and might provide the needed lubricity to assist in the movement of the movable mandrel.

Figure 5:
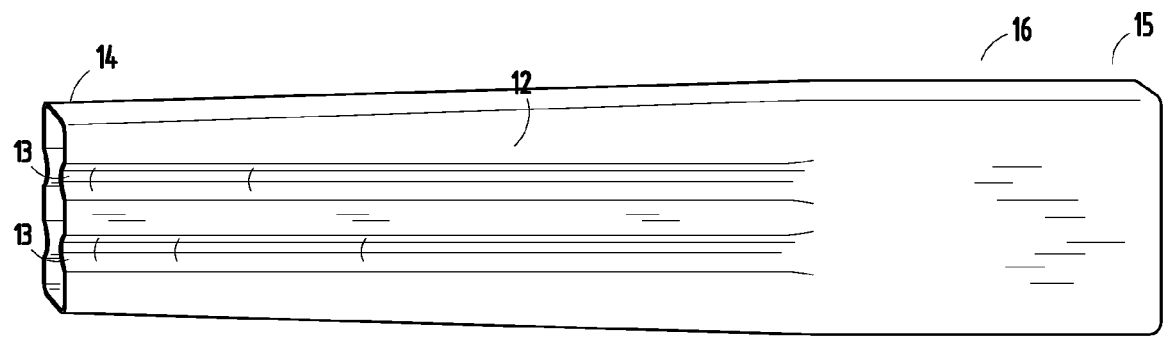
FIG. 5 shows a side view of the crushable structure, the structural ribs that run the length of the part being washed out towards the back of the part due to the reforming process.
Figure 6:
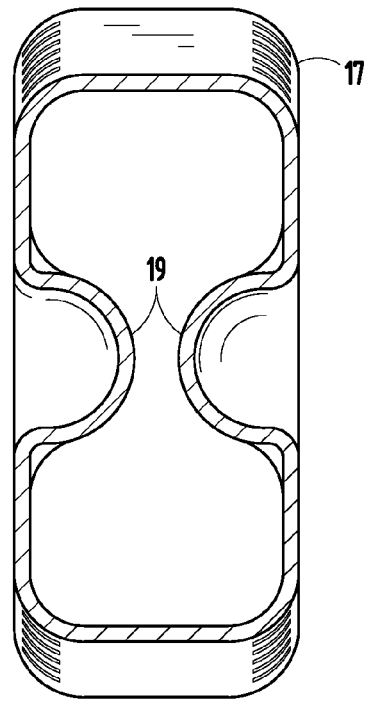
FIGS. 6-6A shows front and back cross sections for another geometry that uses only one geometric rub that runs the length of the part.
Figure 6A:
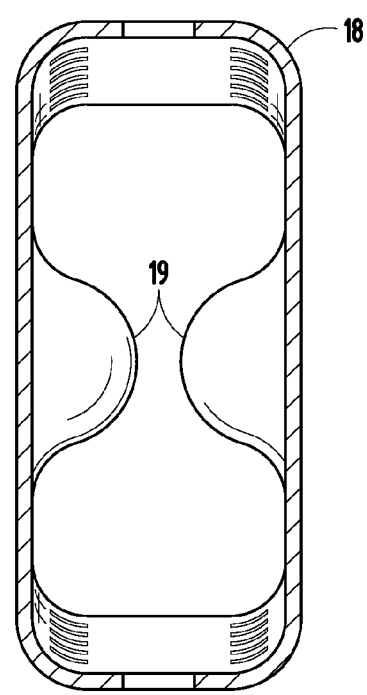
Figure 7:
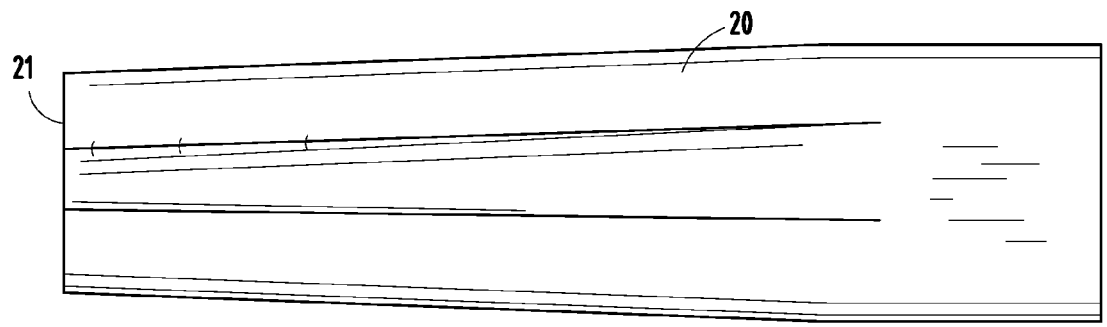
FIG. 7 shows a side view of the crushable structure of FIG. 6, the structural rib that runs the length of the part being washed out towards the back of the part due to the reforming process.

FIG. 5 contains a side view of the double tapered rectangular frame rail tip 12 (also sometimes called in the bumper art as a "longitudinally-crushable bumper beam isolator," "crush tower," "bumper mount," or "bumper mounting bracket" by persons skilled in this art), one end of which is constructed and adapted to mate with the frame rail of a vehicle and another end which is adapted to support a transverse bumper reinforcement beam in front of the vehicle frame. The material of the rib structures 13 is used to change the height of the side of the rectangular tube and produce a double tapered shape. The rib structures are completely removed from the long leg of the rectangular frame rail tip at the point where the frame rail tip ceases taper and finishes in fixed leg height from point 16 to the end of the part. This is the end of the part that will mate with the frame rail of the vehicle. FIG. 7 contains a side view of another double tapered frame rail tip 20 where the washing out of the rib structure 21 (i.e. a single rib on each opposing long side wall) is evident down the length of the tip. The rib structure 21 is completely washed out at the end of the taper section.

The proposed concept will require an additional amount of material when compared to a hydro-formed part due to the rib structures that are used for and account for the differences in vertical leg length because of the tapered shape. This is not necessarily a drawback for the proposed concept since the proposed concept can be made from a large variety of metals. Materials with higher physical properties can be used since the proposed concept and preferred manufacturing process is roll-forming. The selection of higher grade material with higher physical properties will allow for the reduction of material thickness and yet achieve similar performance when comparing energy absorption capabilities. Further, stamping requires excess material since there must be overlapped flanges when opposing stamped "clam-sheet" components are welded together, such that a net result is that the roll forming process does not require a substantial additional amount of material.

The additions of the structural ribs that run the length of the crushable structure add strength to the part when the part is loaded in an axial or a near-axial direction. This increase in strength is referred to column strength. The desired mode of crush is an accordion style of crush where deformation is initiated at the smaller end of the structure and deformation progresses toward the large end of the structure. This mode of deformation is possible due to the increasing perimeter of the part along the length of the part. The inclusion of the structural ribs actually increased column strength where the ribs are most pronounced in geometry. The presence of the structural ribs cause the initiation of crush somewhere down the length of the tube were there is a balance in rib structure geometry and part perimeter. To overcome the inherent increase in stiffness due to the structural ribs, apertures need to be added to the part in strategic locations in an attempt to reduce column strength. The addition of apertures is done while the material is in the flat and before the material is passed through the roll-form tooling. Inclusion of apertures while the material is in the flat and as a part of the roll-forming process makes the inclusion of the apertures a very cost effective process.

Figure 8:
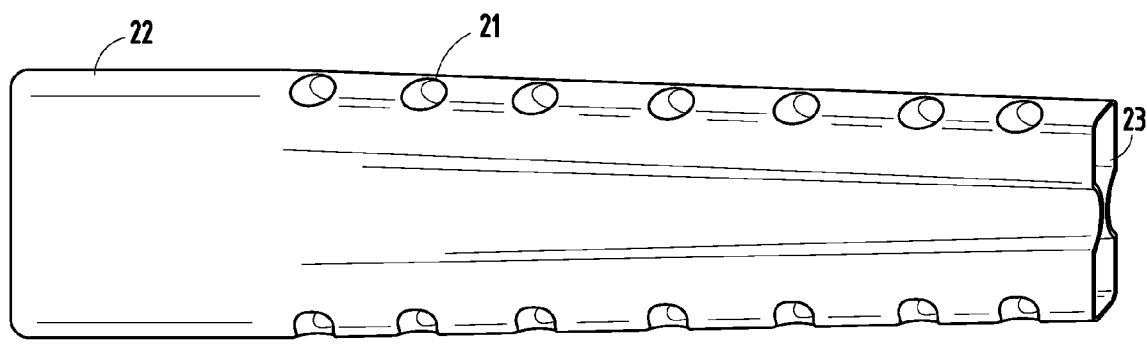
FIG. 8 shows crush initiators added to the external radii of the crushable structure. These crush initiators help to promote accordion-style deformation on axial or near-axial impact.
Figure 9:
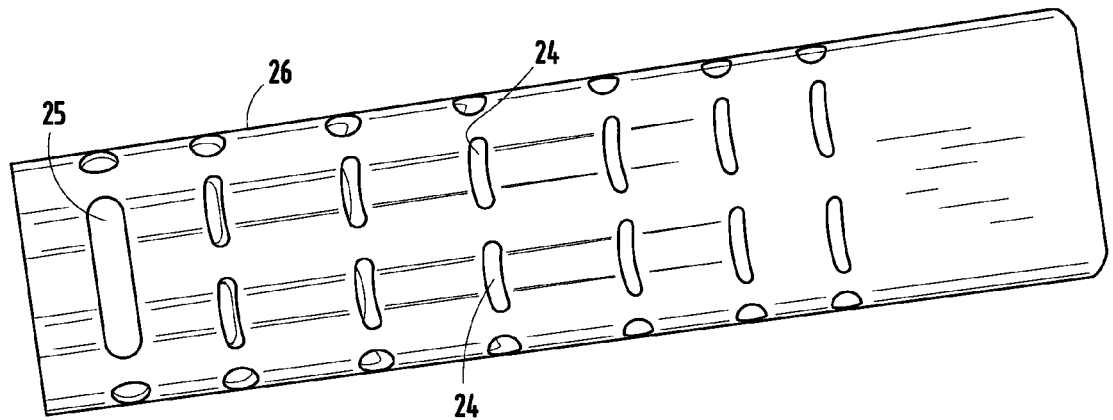
FIG. 9 shows additional crush initiators that help to reduce the stiffness of the structural ribs that run the length of the part.
Figure 10:
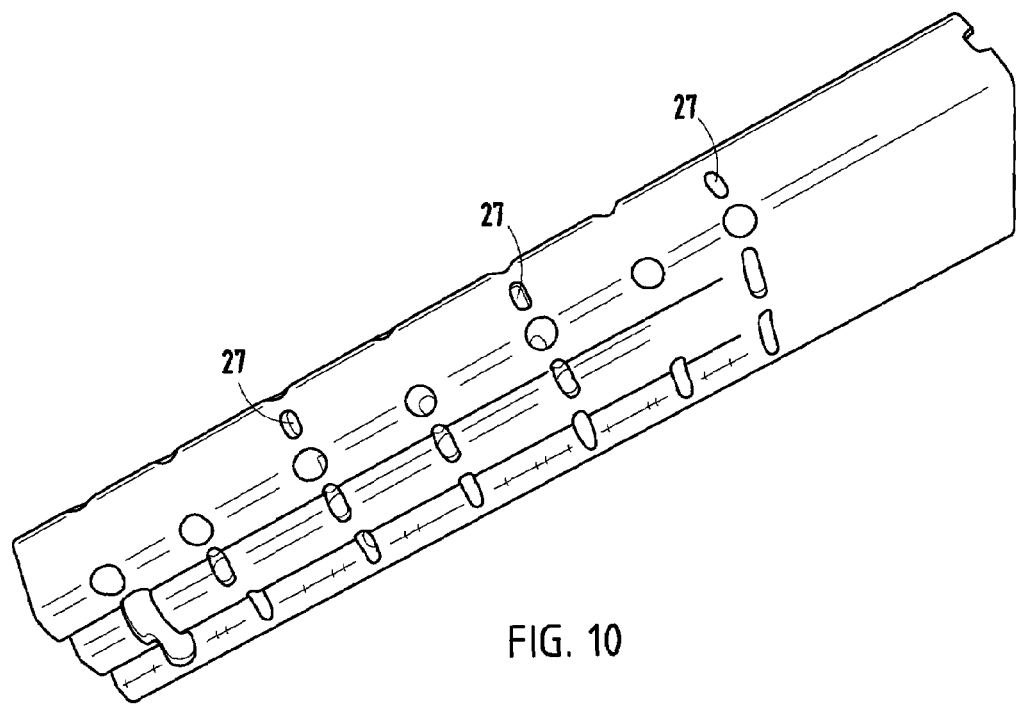
FIG. 10 shows additional crush initiators that have been added to the top and bottom surfaces of the crushable structure. These crush initiators help to promote accordion-style crush for axial or near-axial impacts.

FIG. 8 illustrates aperture 21 placement on the major radii of the polygonal shaped frame rail tip 22. The inclusion of apertures 21 help to initiate crush in the structure but do not help to offset the increase in stiffness associated with the structural ribs 23. FIG. 9 illustrates the inclusion of apertures that weaken the increased crush strength due to the inclusion of the structural ribs. The structural rib strength is reduced by adding slot shaped apertures that extend over the radii that form the structural ribs. These slot apertures will weaken the column strength of the full structure and help to facilitate accordion crush which will be initiated from the smaller end and progressively stack up to the larger end. A larger aperture 25 is added to the front of the crushable structure and the presence of this aperture will promote first buckle point at this location due to the size and placement of the aperture. FIG. 10, additional apertures 27 can be added to the top and bottom surfaces of the crushable structure to further assist in the sequence of accordion crush and the load magnitude required to crush the structure. The use of apertures to assist in the predictability and impact load required to crush a structure is not new or novel. The uniqueness of the apertures used here has to do with the shapes, locations and the number of apertures required to achieve an accordion style crush that sequentially propagates from the small end of the structure to the large end of the structure.

We claim:

1. A longitudinally-crushable energy-absorbing frame rail tip constructed to mate with a vehicle frame and adapted to support a transverse bumper reinforcement beam on the vehicle frame, comprising:
an elongated polygonal tube defining a longitudinal direction and having at least four walls and corners joining the four walls, the tube having a larger first end constructed to mate with a vehicle frame rail and a smaller second end, at least two of the walls including one or more longitudinally elongated channel-shaped tapered ribs starting at the smaller second end and extending toward the larger first end, the ribs extending at least half of a length of the tube and becoming shallower the closer that the ribs are to the larger first end, the channel-shaped tapered ribs undesirably strengthening the at least two walls, but the walls including crush initiators so that the ribs do not provide undesired strength to the tube during a longitudinal impact parallel the longitudinal direction.

2. The frame rail tip defined in claim 1, wherein a perimeter of the first end is approximately equal to a perimeter of the second end including material forming the ribs.

3. The frame rail tip defined in claim 1, wherein the crush initiators include apertures formed into the walls and corners at locations to promote uniform predictable collapse upon receiving a longitudinal impact.

4. The frame rail tip defined in claim 3, wherein at least some of the apertures form a row generally aligned longitudinally.

5. The frame rail tip defined in claim 1, wherein the one or more ribs include at least one shallow channel formed into an opposing pair of the four walls.

6. The frame rail tip defined in claim 1, wherein the one or more ribs include two channels formed into each of an opposing pair of the four walls.

7. The frame rail tip defined in claim 6, wherein the opposing pair of walls include a planar wall section between the two channels.

8. The frame rail tip defined in claim 1, wherein the at least four walls includes three walls that extend longitudinally parallel each other and a fourth wall that is angled longitudinally relative to the other three walls.

9. The frame rail tip defined in claim 1, wherein the at least four walls includes two walls that extend longitudinally parallel each other and third and fourth walls wall that are angled longitudinally relative to the other two walls.

10. The frame rail tip defined in claim 1, wherein at least some of the crush initiators are formed in the tapered ribs.

11. The frame rail tip defined in claim 10, wherein at least some of the crush initiators are apertures formed in the tapered ribs.

12. The frame rail tip defined in claim 1, wherein the polygonal tube has a continuously decreasing cross sectional size.

13. A method of fabricating a longitudinally-crushable energy-absorbing frame rail tip constructed to mate with a vehicle frame and adapted to support a transverse bumper reinforcement beam on the vehicle frame, comprising steps of:
roll-forming a polygonal tubular shape having a constant non-circular cross section including at least four walls and corners joining the walls, at least two of the walls including one or more longitudinally elongated channel-shaped ribs;
reforming the tubular shape outwardly into a tapered polygonal shape with a larger end and a smaller end, the ribs being tapered and becoming shallower as the ribs extend closer to the larger end; and
forming crush initiators in the tapered ribs to avoid undesirably adding strength to the at least two walls having the ribs.

14. The method defined in claim 13, wherein a perimeter length of the first end is approximately equal to a perimeter length of the second end including material forming the ribs.

15. The method defined in claim 13, including forming pre-pieced apertures into the walls, the apertures being positioned on the walls and corners to act as crush initiators for promoting a uniform telescoping collapse upon longitudinal impact.

16. The method defined in claim 13, including prior to the step of roll-forming, steps of providing a sheet, and forming apertures in the sheet in a generally aligned longitudinal row.

17. The method defined in claim 13, wherein the step of roll-forming includes forming the ribs as shallow channels formed into an opposing pair of the four walls.

18. The method defined in claim 13, wherein the step of roll-forming includes forming a pair of the ribs as shallow channels into each of an opposing pair of the four walls.

19. The method defined in claim 13, wherein the step of roll-forming includes forming a planar wall section between the two channels.

20. The method defined in claim 13, wherein the step of reforming includes forming three walls that extend longitudinally parallel each other and a fourth wall that is angled longitudinally relative to the other three walls.

21. The method defined in claim 13, wherein the step of reforming includes forming two walls that extend longitudinally parallel each other and third and fourth walls that are angled longitudinally relative to the other two walls.

22. The method defined in claim 13, wherein the step of reforming includes forming the tubular shape to have a continuously decreasing cross sectional size.

23. The method defined in claim 13, including, after the step of reforming, a step of mating the tubular shape to a vehicle frame rail.

24. The method defined in claim 13, including a step of forming apertures in the tubular shape in corners between at least some of the walls.

* * * * *